May 3, 1966     D. W. AMOS     3,249,706

SENSING APPARATUS

Filed Sept. 13, 1965

INVENTOR.
DOUGLAS W. AMOS
BY *Francis A...*
ATTORNEY

United States Patent Office 3,249,706
Patented May 3, 1966

3,249,706
SENSING APPARATUS
Douglas W. Amos, Minneapolis, Minn., assignor to Honeywell Inc., Minneapolis, Minn., a corporation of Delaware
Filed Sept. 13, 1965, Ser. No. 486,626
6 Claims. (Cl. 200—17)

My invention is concerned with an improved sensing apparatus of the type which senses the positional displacement of the apparatus relative to a datum, and converts this displacement into an electrical transducer output.

Specifically, my invention is concerned with an improved sensing apparatus in which a unique structural arrangement is provided to force bias a rotary shaft against rotation which occurs as displacement occurs, and to convert shaft rotation into an electrical output by means of a transducer having a first structural element carried by the rotary shaft and a second relatively fixed structural element cooperating with the first element, one of the elements having a unique manner of adjusting the operation of the transducer means by rotating at least a part of this element about an axis which is displaced from the axis of rotation of the shaft.

Figure 1:
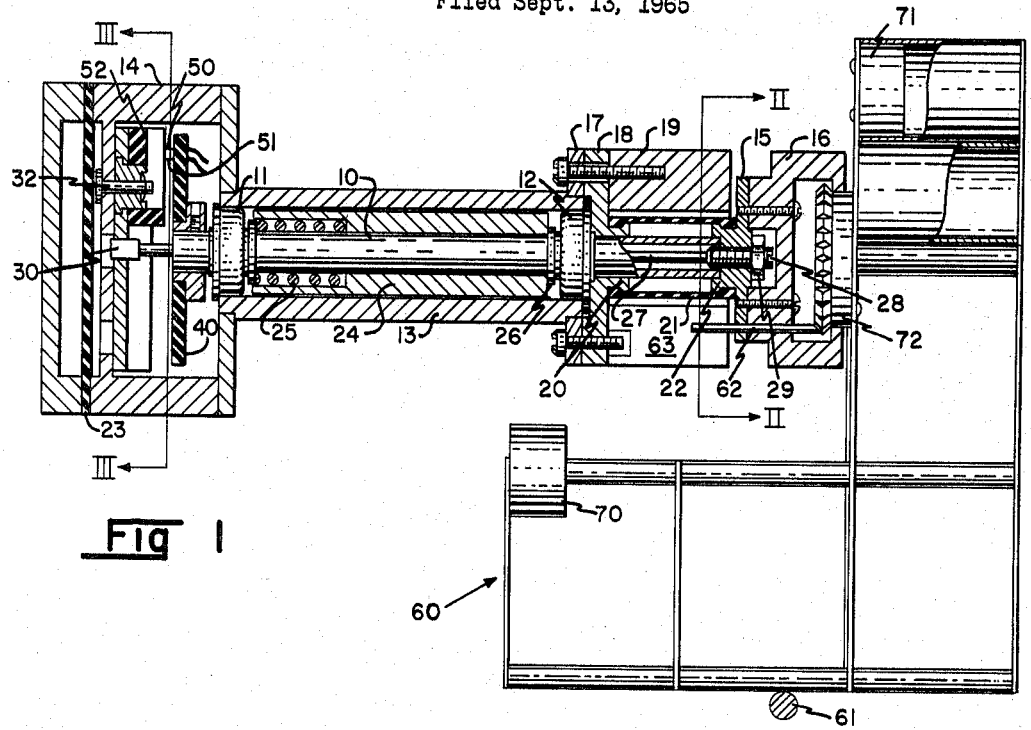
Figure 3:
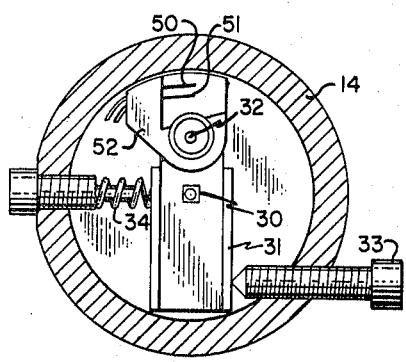
Figure 4:
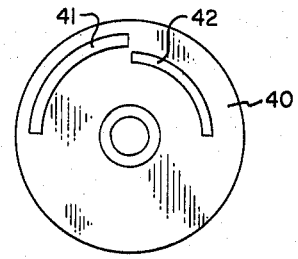
Figure 2:
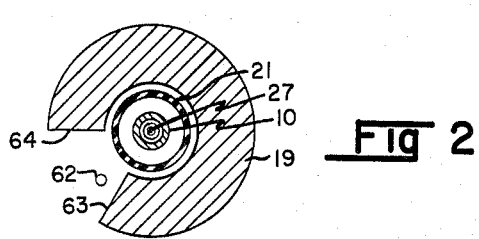

FIGURE 1 is a side view of my invention, certain portions of the structure being shown in cross-section, FIGURE 2 is a section view of FIGURE 1, taken along section line 2—2, FIGURE 3 is a section view of FIGURE 1 taken along section line 3—3, and FIGURE 4 is a showing of one of the elements of the electrical transducer of FIGURE 1.

Referring to FIGURE 1, reference numeral 10 identifies a hollow shaft which is mounted in bearings 11 and 12 secured to a portion 13 of a housing structure, the housing structure including an end portion 14 which houses the electrical transducer.

Shaft 10 is hollow and carries an annular disk-like member 15 having a stop member 16 secured thereto. The portion 13 of the housing is provided with a shoulder 17 to which members 18 and 19 are secured, member 18 including an annular shoulder 20 to which a flexible boot 21 is secured, the flexible boot 21 also being attached to an annular shoulder 22 formed in member 15.

The portion 14 of the housing includes a flexible diaphragm 23 which seals the structure such that the internal cavity may be filled with an electrically-nonconductive oil to form a means to damp rotation of shaft 10.

This damping arrangement is provided by means of a cylinder 24 which is biased by means of an axial strain relief spring 25 to abut a shoulder 26 carried by shaft 10. Cylinder 24 has an outer diameter which is just slightly less than the inner diameter of portion 13 of the housing and since this spacing is occupied by oil, the shear force of the oil resists rotation of shaft 10.

Reference numeral 27 identifies spring means in the form of a torsion rod, one end of which is threaded into member 15 and is capable of adjustment by means of a screw driver slot 28, the adjustment being locked by means of a nut 29. The other end of torsion rod 27 has a slip fitting such that rod 27 and shaft 10 may move axially to the left as shown in FIGURE 1, the left hand end of the torsion rod slipping in a coupling 30, also shown in FIGURES 1 and 3.

Referring to FIGURE 3, the slip coupling of torsion rod 27 to the structure which constitutes a portion of the housing is accomplished through a member 31 (FIGURE 3) which is mounted to the portion 14 of the housing by way of a pin 32 such that the member 31 pivots about a second axis defined by pin 32, this axis being displaced from the axis of shaft 10. The position of member 31 is adjusted by adjusting screw 33, member 31 being held firmly against screw 33 by a spring 34.

The electrical transducer means portion of my invention constitutes a first member 40 in the form of an insulating disk carrying a pair of contact segments 41 and 42 (FIGURE 4), these contact segments being displaced at unequal distances from the axis as defined by shaft 10. Cooperating with the contact surfaces 41 and 42 are a pair of contact wipers 50 and 51, FIGURES 1 and 3. Wipers 50 and 51 are carried on an insulating plate 52 which is rigidly fixed to and carried by member 31, the assembly 31, 52 rotating as a single unit about the axis defined by pin 32. Thus, rotation of the assembly 31, 52 (as controlled by adjustment 33) is effective to rotate wipers 51 and 52 about the axis of pin 32, which axis is displaced from the axis of shaft 10. This rotation produces relative movement of contact wipers 50 and 51 in relation to the contact segments 41 and 42 carried by the first member of the electrical transducer. As a result, the differential of the transducer is controlled by the position of member 33.

In order to produce rotation of shaft 10, I provide a follower means 60. This follower means is shown as engaging a datum 61, which may be a wire or the like, and this engagement has caused shaft 10 to rotate such that a pin 62 carried by member 16 assumes the position shown in FIGURE 2. Normally this pin engages the surface 63 of stop member 19, surface 63 limiting the rotation of the shaft and establishing a bias force created by spring means 27. This bias force determines the force which must be overcome to displace the follower senser in order to rotate shaft means 10 in a direction toward surface 64 of stop member 19.

The structure of follower means 60 is such that the various structural members, including weights 70 and 71, are located so as to produce a center of gravity existing in the vicinity of a snap-on coupling 72 which couples the follower means to member 16. An extension of pin 62 cooperates with coupling 72 to provide a means of locating the follower means at only one position in relation to member 16. Since the center of gravity of follower means 60 resides at the point of the coupling, vibration and the like which tends to uncouple the follower means from the sensing apparatus is minimized.

I claim as my invention:
1. Sensing apparatus comprising:
   rotary shaft means mounted to define a first axis,
   spring means attached to said shaft means to bias said shaft means for rotation in a given direction,
   stop means cooperating with said shaft means to limit the rotation of said shaft means in said given direction and thereby provide a bias force which must be overcome in order to rotate said shaft means in the opposite direction,
   electrical transducer means having a first member with first and second contact segments which are radially spaced at different distances from said first axis, and having a second member with first and second contact segments radially spaced at different distances from said first axis and cooperating with the first and second contact segments of said first member,
   means mounting one of the members of said transducer means to rotate with said shaft means and the other of the members in a fixed position,
   and adjusting means cooperating with one of the members of said transducer means to rotate the first and second contact segments thereof about a second axis which is displaced from said first axis.
2. Sensing apparatus as defined in claim 1 wherein said shaft means is hollow and said spring means is a torsion rod positioned within said shaft means.
3. Sensing apparatus as defined in claim 2 wherein one of the portions of said torsion rod is provided with means to adjust said bias force.

4. Sensing apparatus as defined in claim 2 wherein one of the portions of said torsion rod is provided with a slip coupling and said shaft means includes strain relief means to facilitate axial movement of said shaft means and said torsion rod along said first axis.

5. Sensing apparatus as defined in claim 1 wherein the first member of said electrical transducer means is an insulating plate with said first and second contact segments comprising electrically conductive surfaces, and the second member is an insulating plate with said first and second contact segments comprising conductive wipers to cooperate with said conductive surfaces as switches, the differential in actuation of the switches being controlled by rotation of said wipers about said second axis.

6. Sensing apparatus as defined in claim 1 wherein follower means is attached to an end portion of said shaft means to produce rotation of said shaft means, and said follower means is constructed and arranged to have a center of gravity existing at the approximate point of attachment to said shaft means.

No references cited.

ROBERT K. SCHAEFER, *Primary Examiner.*